(12) United States Patent
Horner (10) Patent No.: US 10,106,263 B2
(45) Date of Patent: Oct. 23, 2018

(54) WIRELESS AIRCRAFT CABIN PRESSURE CONTROL SYSTEM UTILIZING SMART PRESSURE SENSORS

(71) Applicant: HONEYWELL INTERNATIONAL INC., Morris Plains, NJ (US)

(72) Inventor: Darrell W Horner, Oro Valley, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 326 days.

(21) Appl. No.: 15/056,832

(22) Filed: Feb. 29, 2016

(65) Prior Publication Data
US 2017/0247112 A1  Aug. 31, 2017

(51) Int. Cl.
*B64D 13/04* (2006.01)
*B64D 45/00* (2006.01)

(52) U.S. Cl.
CPC ............ *B64D 13/04* (2013.01); *B64D 45/00* (2013.01)

(58) Field of Classification Search
CPC ................................. B64D 13/04; B64D 45/00
USPC ............................................................ 701/3
See application file for complete search history.

(56) References Cited

U.S. PATENT DOCUMENTS

| | | | |
|---|---|---|---|
| 6,746,322 B2 | 6/2004 | Scheerer et al. | |
| 7,140,257 B2 | 11/2006 | Henson et al. | |
| 7,633,420 B2 | 12/2009 | DuPuis | |
| 9,182,257 B2 | 11/2015 | Park et al. | |
| 2004/0073571 A1* | 4/2004 | Kumhyr | G08G 1/005 |
| 2005/0096086 A1 | 5/2005 | Singamsetty | |
| 2005/0187677 A1* | 8/2005 | Walker | B64C 13/20 701/16 |
| 2006/0019594 A1* | 1/2006 | Horner | B64D 13/02 454/74 |
| 2006/0250256 A1* | 11/2006 | Power | G08B 21/06 340/575 |
| 2009/0243895 A1 | 10/2009 | Mitchell et al. | |
| 2012/0256055 A1* | 10/2012 | Jolly | B64C 27/51 244/189 |
| 2013/0204548 A1 | 8/2013 | Yu et al. | |
| 2017/0345230 A1* | 11/2017 | Bill | G07C 5/008 |

FOREIGN PATENT DOCUMENTS

| | | |
|---|---|---|
| CN | 202080430 U | 12/2011 |
| WO | 2015124891 A1 | 8/2015 |

OTHER PUBLICATIONS

Search Report from EP application No. 17154088.3 dated Jul. 24, 2017.

* cited by examiner

*Primary Examiner* — Yazan A Soofi
(74) *Attorney, Agent, or Firm* — Shimokaji IP (57) ABSTRACT

A pressure control system includes a first sensor, and a second sensor which is dis-similar to the first sensor, where the second sensor generates a same processed data as the first sensor does, but in a way different from the first sensor does. A receiving unit is connected to the first sensor and the second sensor by a wireless connection to receive the processed data from the first sensor and the second sensor. In addition, the receiving unit is connected to the first sensor by a second connection different from the wireless connection to receive the processed data from the first sensor. Additional receiving units are connected to the first sensor and the second sensor by the wireless connection to receive the processed data.

20 Claims, 11 Drawing Sheets

WIRELESS AIRCRAFT CABIN PRESSURE CONTROL SYSTEM UTILIZING SMART PRESSURE SENSORS

BACKGROUND OF THE INVENTION

The present invention generally relates to a pressure control system and method and, more particularly, to an improved pressure control system and method using multiple and dissimilar smart sensors to form multiple networks for a pressure control system, such as for aircraft cabins.

Many aircraft are designed to fly at relatively high altitudes, to save fuel and to avoid bad weather and turbulence at lower altitudes. As the altitude of an aircraft increases, the ambient pressure outside of the aircraft decreases and, the pressure differential between the pressure of the cabin air and the pressure of the ambient air, typically referred to as the cabin-to-ambient differential pressure, can increase as well unless otherwise controlled. With the increase of the cabin-to-ambient differential pressure beyond a certain limit, fuselage structural or seal failure may occur whereby excessive amounts of air may leak out of the aircraft cabin causing it to decompress to an undesirably low pressure. An undesirably low pressure in the aircraft cabin can cause health hazards for passengers or other undesired impacts. Thus, many aircraft are equipped with a cabin pressure control system to, among other things, maintain the cabin pressure to be within a relatively comfortable range and allow gradual changes in the cabin pressure to minimize passenger discomfort.

Modern aircraft are extremely complex systems comprising many types of electronic systems on board. These electronic systems may serve different but related functions, such as a cabin pressure control system, a flight deck display system, a crew alert system, an oxygen deploy system, and a maintenance computer system, etc. These types of systems often rely on the use of sensors to operate. For example, a cabin pressure control system for a cabin in an aircraft may use different sensors such as temperature sensors and airflow sensors to identify changes that may be needed to maintain a desired pressure in the cabin. In addition, these sensors can also be used by other systems, such as a flight deck display system, a crew alert system, and an oxygen deploy system. Packaging of the sensors in each of the cabin pressure control system, the crew alert system, or the oxygen deploy system controllers requires redundancy that is expensive and inefficient. Sharing data from all of the sensors to all of the systems using the data requires significant wiring. Wiring on the airplane to connect the various electronic systems and sensors can be expensive, heavy, hot, and difficult to install and maintain.

Traditionally, cabin pressure sensors have been located within the cabin pressure controller. Accordingly, cabin pressure sensors may be replicated in each cabin pressure controller or outflow valve controller. In some sensor architecture, command and monitor sensors may be required for each automatic control. Thus, in a two-channel system, four pressure sensors may be required for that functionality by itself, since sensors may be replicated for each channel. Thus, traditional large aircraft systems can have four to six pressure sensors performing similar functions. The duplication of sensors for each controller using the sensor can add cost and weight, and reduce the reliability of the overall system.

Furthermore, cabin pressure sensors may be connected to the cabin pressure controller in an analog or high-speed data bus to enable the timing sensitive nature of the cabin pressure controller use of the pressure signal. Specialized cabin pressure controllers may be needed to perform high speed pressure reading and oversampling techniques. In addition, cabin pressure control systems may also require time-based synchronization between the sensor and the controller. These specialized cabin pressure controllers may include high resolution analog-to-digital converters which are capable of high-accuracy pressure sensor reading and differentiating techniques. Thus, cabin pressure control functionality may not be able to be implemented on general purpose avionics computers.

In the industry and in this disclosure, a system on the aircraft may be called different names. For example, a cabin pressure control system may be called a Cabin Pressure Control System (CPCS) controller, a CPCS Main Controller, or a cabin pressure controller. All these names refer to the same system controlling the cabin pressure in an aircraft. Similarly, a flight deck display system may be simply called as a flight deck display, or a flight deck display controller, while a maintenance computer can be referred to as a maintenance computer system, or a maintenance system.

Figure 1A:
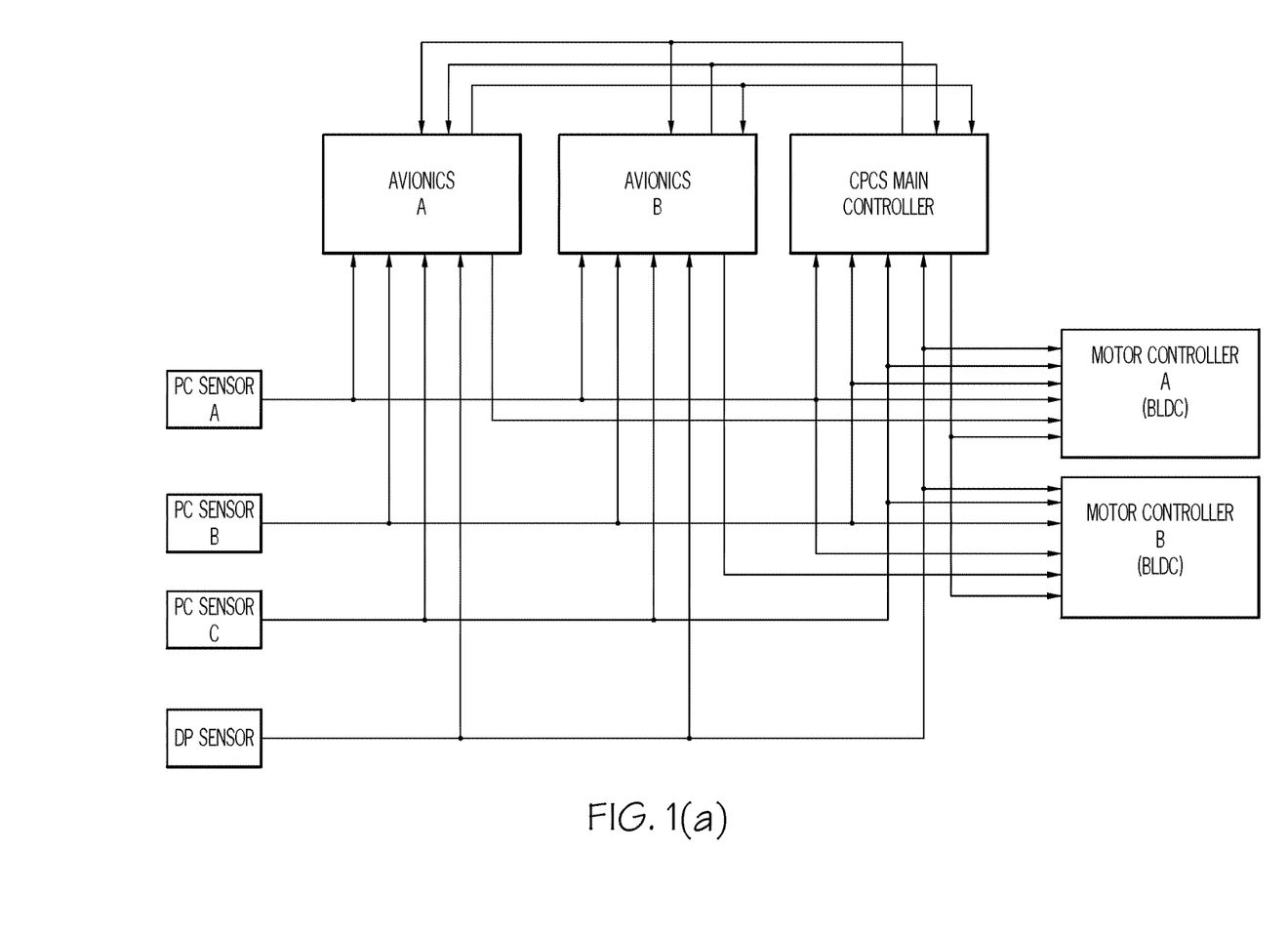
FIGS. 1(a)-1(c) depict traditional wired network systems comprising sensors, a cabin pressure controller, and other avionics components and controllers.
Figure 1B:
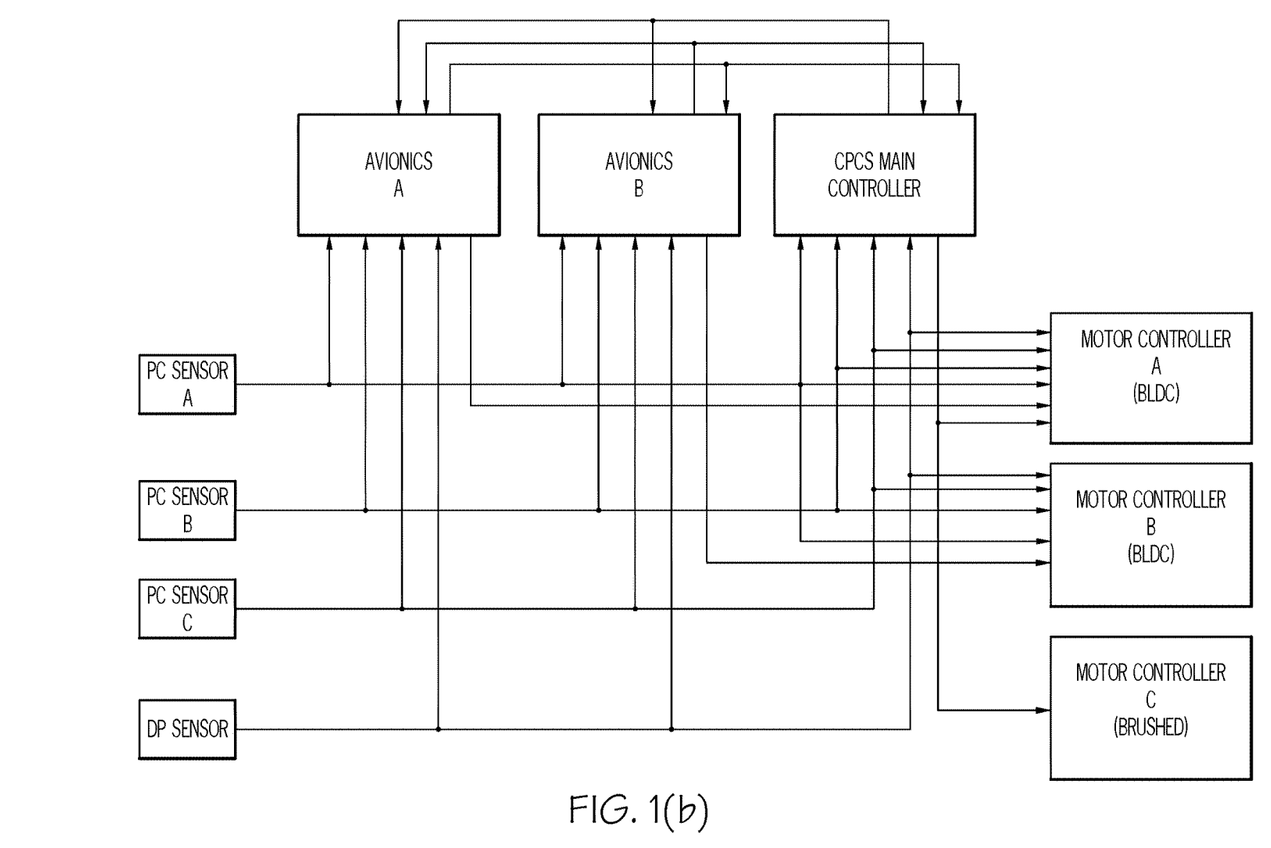
Figure 1C:
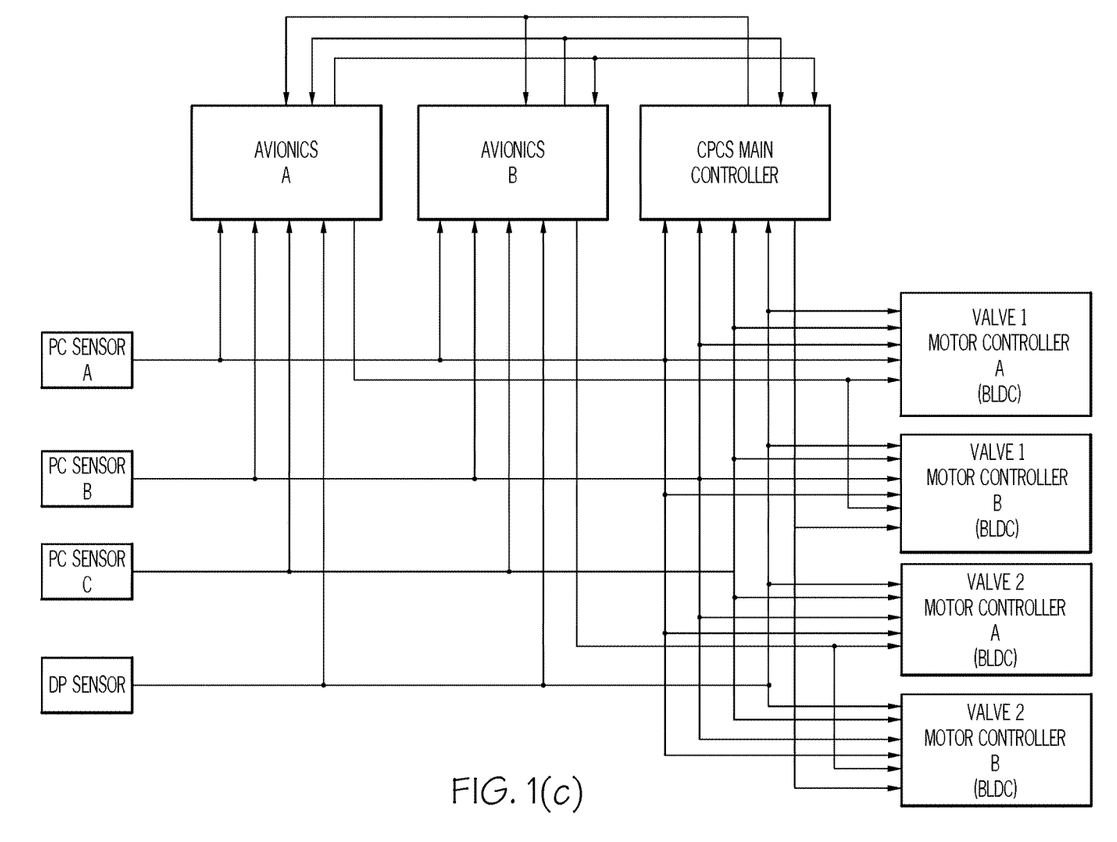

FIGS. 1(a)-1(c) depict traditional wired network systems comprising sensors, a cabin pressure controller, and other avionics components and controllers.

As shown in FIGS. 1(a)-1(c), many aircraft functions can be implemented by a general purpose computer such as Avionics A, Avionics B, or special purpose computers such as CPCS Main Controller, or other controllers such as Motor Controller A, Motor Controller B, Motor Controller C, Valve 1 Motor Controller A, Valve 1 Motor Controller B, Valve 2 Motor Controller A, or Valve 2 Motor Controller B.

As shown in FIGS. 1(a)-1(c), different sensors, such as PC Sensor A, PC Sensor B, PC Sensor C, may be used for sensing Cabin Pressures, while DP Sensor may be used for sensing the cabin-to-ambient Differential Pressure.

These sensors, such as PC Sensor A, PC Sensor B, PC Sensor C, DP Sensor may be connected by wires or conductive lines to controllers so that the sensors are physically closely coupled to the controllers to provide accurate, high resolution, pressure data or other data, in order for the cabin pressure controllers to differentiate the pressure data and obtain pressure rate data. The pressure rate computation may further require certain synchronization of the pressure sensor inputs, as the rate computation is a time-based "derivation" of the pressure.

As shown in FIGS. 1(a)-1(c), all of the system interfaces and redundancy may require significant wiring on the airplane. Each sensor is fully connected to all other component by wires. Many, if not all, of the interconnections depicted are actually twisted, shielded communication pairs. As such, there are some significant drawbacks to the current technology such as: large wiring weight; excessive wiring heat dissipation which may be caused by current through resistive conductors; large wiring space in the various routes in the airplane; low wiring reliability caused by failures of conductors, shielding, terminations, and connector pins (for the cable and the equipment side of each connection); high cost wiring maintenance for detecting wire failure; high cost of wiring bundle fabrication and installation; and limited risk failure modes—wiring must be routed redundantly and through different pathways, to prevent common mode failures due to engine rotor burst, tire burst, bird strike, etc. These drawbacks also lead to significant airplane-level design and integration problems regarding proper design of wiring bundles, accounting for wiring routes and space since wires are not easily dimensioned or modeled in a 3-D design tool. Often, wiring is one of the last systems to be integrated on the airplane, and recent Airbus A380 news show that significant delays were caused by the wiring needing to be redesigned late in the airplane program.

As can be seen, there is a need for improved apparatus and methods for pressure systems and sensors.

SUMMARY OF THE INVENTION

In one aspect of the present invention, a pressure control system comprises: a first sensor, and a second sensor different from the first sensor, wherein the first sensor and the second sensor generate processed data from its sensor readings; a first receiving unit and a second receiving unit connected to the first sensor and the second sensor by a wireless connection to receive the processed data from the first sensor and the second sensor, wherein the first receiving unit is connected to the first sensor by a second connection different from the wireless connection to receive the processed data from the first sensor, and the processed data is output in a format so that the first receiving unit uses the processed data in the format without further processing.

In another aspect of the present invention, a pressure control system comprises a first sensor, and a second sensor which is dis-similar to the first sensor, wherein the first sensor and the second sensor generate processed data from its sensor readings; a receiving unit connected to the first sensor and the second sensor by a wireless connection to receive the processed data from the first sensor and the second sensor, wherein the receiving unit is further connected to the first sensor by a second connection different from the wireless connection to receive the processed data from the first sensor.

In yet another aspect of the present invention, a cabin pressure control system for an aircraft comprises a first sensor, and a second sensor which is dis-similar to the first sensor, wherein the first sensor and the second sensor generate processed data from its sensor readings; a first receiving unit connected to the first sensor and the second sensor by a wireless connection to receive the processed data from the first sensor and the second sensor, wherein the first receiving unit is further connected to the first sensor by a second connection different from the wireless connection to receive the processed data from the first sensor, and the first receiving unit is one of a flight deck display system and a crew alert system; and a cabin pressure controller connected to the first sensor and the second sensor by the wireless connection to receive the processed data from the first sensor and the second sensor.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Generally, the present invention provides a wireless network for sensors shared in multiple systems in an environment, such as in a vehicle like an aircraft. In the example of an aircraft, the systems may include a cabin pressure control system, a flight deck display system, a crew alert system, and other systems. The sensors may be connected to more important systems such as the flight deck display system by a second network connection. The sensors may include a first sensor and a second sensor dis-similar to the first sensor, so that the second sensor generates a same data as the first sensor does, but in a way different from the first sensor. The wireless data sharing from the sensors to multiple systems increases the system efficiency. On the other hand, the inclusion of dis-similar sensors and the second network connections provide data safety and integrity for the cabin pressure control system, the flight deck display system, and other systems.

An environment, such as an aircraft, may have multiple computers onboard to perform various functions: e.g., a cabin pressure control system, a flight deck display system, a crew alert system (CAS), an outflow valve controller (disable functions), an oxygen deploy system, and a maintenance computer (for system fault and health reporting and to aid in troubleshooting). Among various functions and systems, some functions and systems may be more important or critical than some other functions and systems. For example, a flight deck display system may be critical. If a flight deck display system does not work, the pilot may lose all the information of the aircraft and will not be able to control and fly the aircraft. Similarly, a crew alert system may be critical as well, and more important than some other functions such as the maintenance system. A flight deck display system and a crew alert system are used merely as examples to show some systems may be more important than others on an aircraft. For different aircraft, different systems may be classified as more important systems. The designation of systems to be critical or more important may be based on the consideration of cost, safety, technology, designer's preferences, and other issues.

FIGS. 2(a)-2(d) depict various smart sensor architectures according to an embodiment of the present invention. One novel approach to the existing pressure sensor problem, where a sensor may be tightly mounted within the controller or physically closely connected by analog or high-speed data bus, is to design a pressure sensor that is able to compute cabin pressure rate-of-change directly on the pressure sensor. A cabin pressure sensor would not just transmit raw cabin pressure, but would add "value" to the system by computing additional parameters, using software and a microprocessor within the cabin pressure sensor. Other sensors, not shown, may be used for different functions such as: controlling cabin pressure, indicating and warning to the flight crew for awareness and abnormal operation, deploying oxygen, or implementing performance of automated safety functionality, such as cabin altitude limiting, cabin-to-atmosphere differential pressure limiting, residual pressure protection on the ground, and monitoring of system cabin pressure and cabin pressure rate control.

Figure 2A:
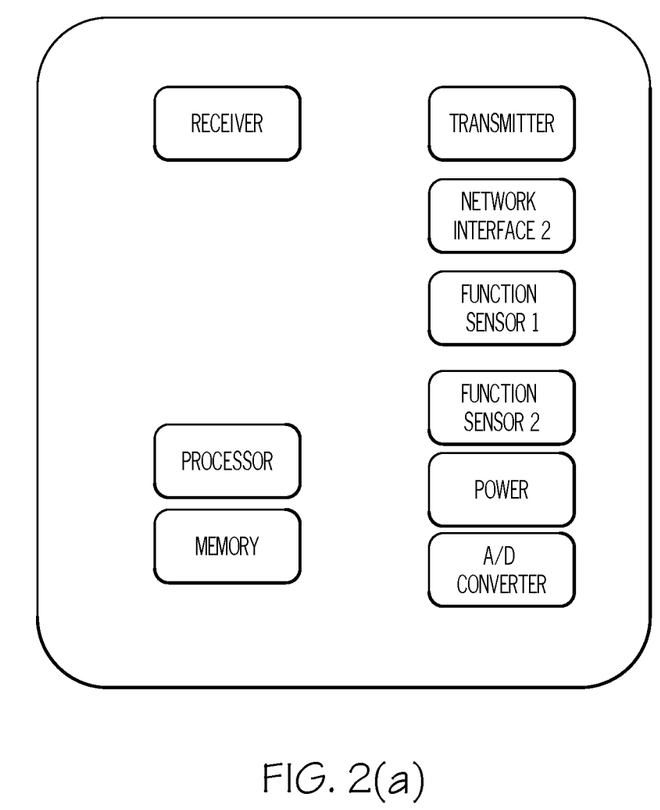
FIGS. 2(a)-2(d) depict smart sensor architectures according to an embodiment of the present invention.
Figure 2B:
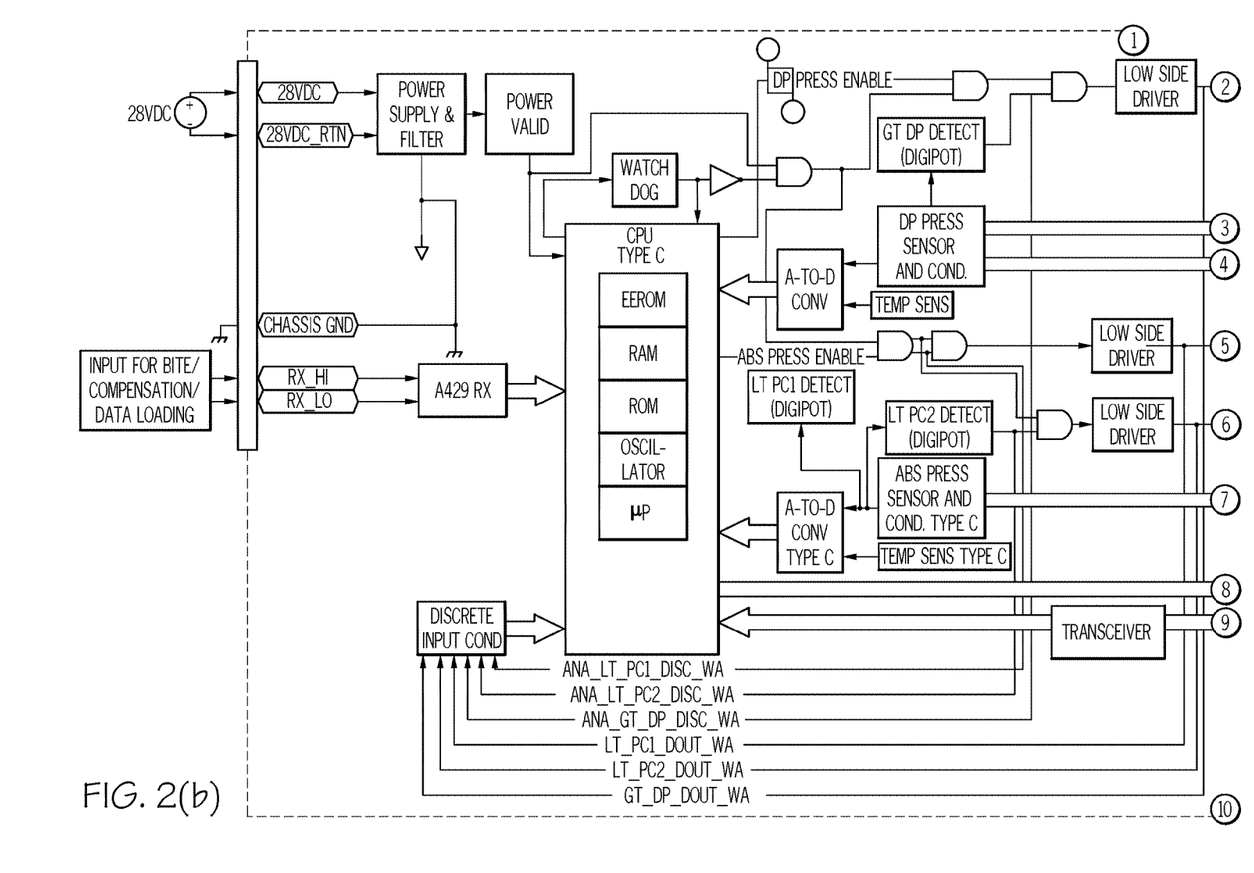

FIG. 2(a) depicts a general architecture for a smart sensor, while FIG. 2(b) depicts a more specific sensor implementation. The smart sensor may comprise Power, A/D (analog-to-digital) converter, Receiver, Transmitter, Network interface 2, Function sensor 1, Function sensor 2, Memory, and Processor. Function sensor 1 and/or Function sensor 2 may be used to detect some functional measurements, such as a temperature, a pressure, or a height. There may be only one or more than two function sensors within the smart sensor. The detected signals may be in an analog format and may be converted into digital format by A/D converter, which may feed the converted digital data into Processor and Memory for processing and storage. Processor may perform various computations to produce data to be used by other functional components in systems. The digital data output from Processor may be transmitted by Transmitter to other functional components. Receiver may be used to receive input from other functional components. Transmitter and Receiver together may be a first network interface. Power, which may be a battery pack or other power source, may be electrically coupled to Processor and Memory unit for providing the smart sensor device with the necessary working power supply. Network interface 2 may be a second network interface so that the sensor can have multiple network connections. Network interface 2 may be a wired connection or an infrared connection.

FIG. 2(b) depicts a more specific example architecture of a smart sensor, implemented according to the general sensor architecture shown in FIG. 2(a). For example, CPU shown in FIG. 2(b) may implement Processor as shown in FIG. 2(a); RAM and ROM shown in FIG. 2(b) may implement Memory as shown in FIG. 2(a); A-to-D Cony shown in FIG. 2(b) may implement A/D converter as shown in FIG. 2(a); Transceiver shown in FIG. 2(b) may implement Transmitter and Receiver as shown in FIG. 2(a), and the battery 28V DC shown in FIG. 2(b) may implement Power as shown in FIG. 2(a).

Figure 2C:
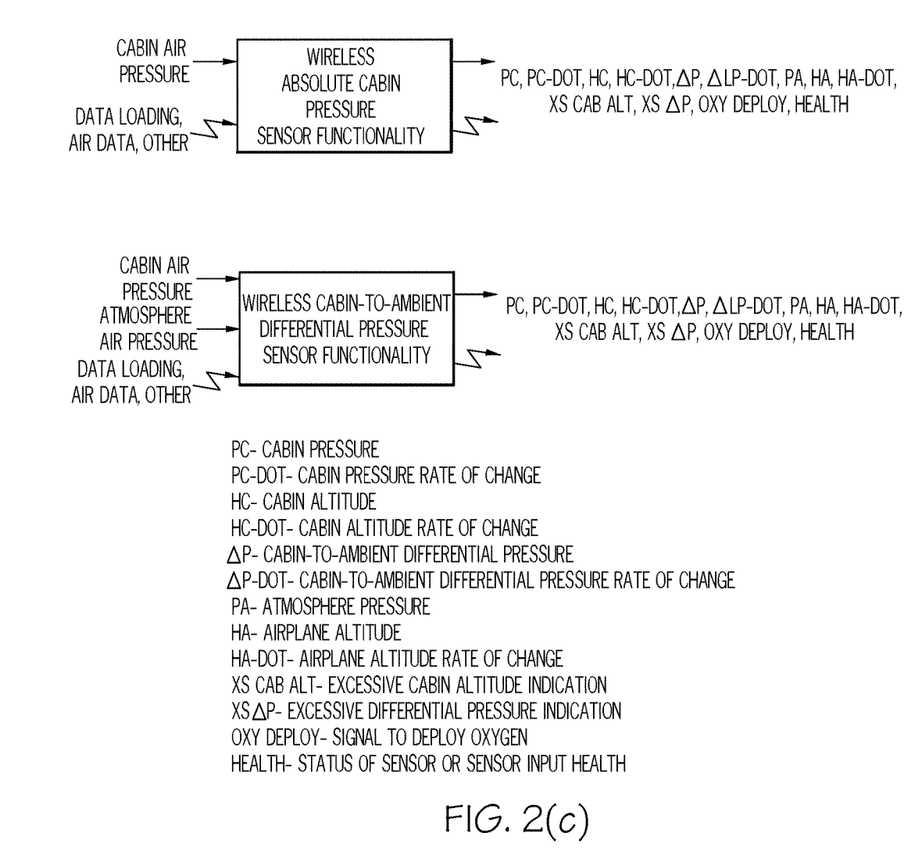
Figure 2D:
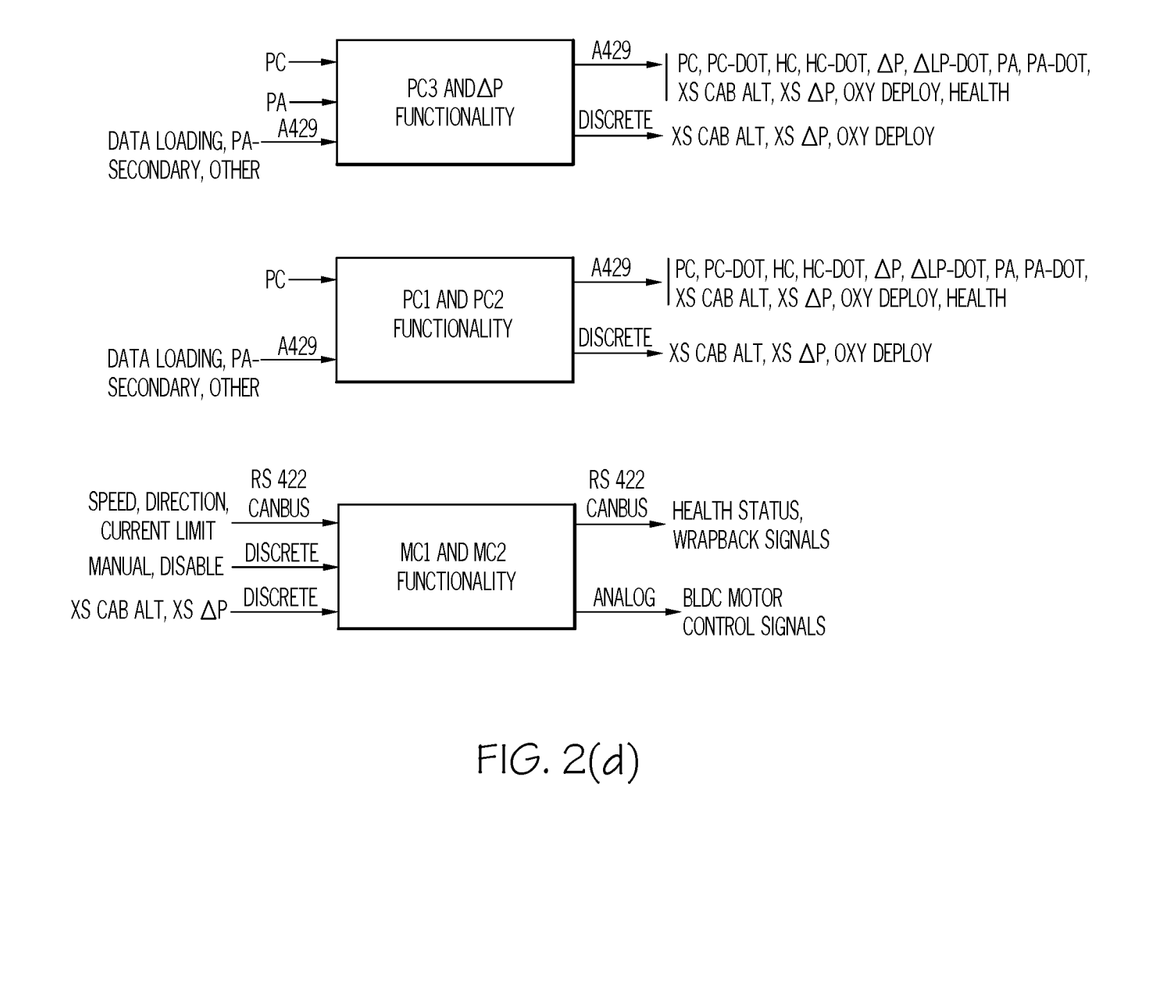

As further examples, two different types of smart sensors, Wireless Absolute Cabin Pressure Sensor, and Wireless Cabin-to-Ambient Differential Pressure Sensor, are shown in FIG. 2(c). In the rest of the disclosure, the term sensor, smart sensor, or pressure sensor, are used interchangeably, since the pressure sensors are used as examples of smart sensors. It is understood that the smart sensor can be used for other functions besides those parameters listed in FIG. 2(c). In addition, as shown in FIG. 2(d), multiple sensors, such as PC1, PC2, and PC3, which can be a Wireless Absolute Cabin Pressure Sensor, and ΔP, which can be a Wireless Cabin-to-Ambient Differential Pressure Sensor, and Motor controllers MC1 and MC2, can be packaged into one package, where a Motor controller may be an Outflow Valve Controller. The packages can receive inputs such as Cabin Pressure (PC), Ambient Pressure (PA), and other discrete or analog data, and perform the intended functions for PC, PA, and Motor controllers.

With the inputs of Cabin Air Pressure, Atmosphere Air Pressure, and/or other data loading from other components of aircraft systems, Wireless Absolute Cabin Pressure Sensor and Wireless Cabin-to-Ambient Differential Pressure Sensor can, using a processor within the sensors, compute one or more of the following for example:

PC—CABIN PRESSURE
PC-DOT—CABIN PRESSURE RATE OF CHANGE
HC—CABIN ALTITUDE
HC-DOT—CABIN ALTITUDE RATE OF CHANGE
ΔP—CABIN-TO-AMBIENT DIFFERENTIAL PRESSURE
ΔP-DOT—CABIN-TO-AMBIENT DIFFERENTIAL PRESSURE RATE OF CHANGE
PA—ATMOSPHERE PRESSURE
HA—AIRPLANE ALTITUDE
HA-DOT—AIRPLANE ALTITUDE RATE OF CHANGE
XS CAB ALT—EXCESSIVE CABIN ALTITUDE INDICATION
XS ΔP—EXCESSIVE DIFFERENTIAL PRESSURE INDICATION
OXY DEPLOY—SIGNAL TO DEPLOY OXYGEN
HEALTH—STATUS OF SENSOR OR SENSOR INPUT HEALTH.

With the above exemplary inputs and outputs that each smart sensor in FIG. 2(c) represents, multiple systems, such as for aircraft, can utilize the direct data transmitted by these smart sensors. For example, a cabin pressure controller (or an avionics computer) can receive cabin pressure and cabin pressure rate, already computed into the appropriate engineering units (feet, feet per minute, pressure, pressure per minute, etc.). An outflow valve controller can utilize pressure, rate, and differential pressure signals to check and balance input commands from the cabin pressure controllers. A flight deck display can utilize the cabin altitude, cabin altitude rate-of-change, and differential pressure for display indications which may be required for certification. A crew alert system can utilize the excessive cabin altitude, or excessive differential pressure to create pilot warnings that required immediate pilot action. An oxygen deploy system can utilize the sensor outputs to determine if the cabin altitude has reached a certain unsafe threshold. A maintenance system can utilize these sensor outputs to perform built-in test and determine which system equipment have failed.

In the examples shown above, since the output data from the smart sensors may have already been processed by the sensors, validated, and output in "engineering units," the systems receiving those output data from the sensors do not have additional processing steps to perform and can use the received data directly for other computations. Therefore, the systems receiving the output data from the sensors can accommodate larger numbers of received data from the sensors, and can achieve higher data integrity, for example, by using voting, or other validation schemes based on the larger numbers of received output data from the sensors.

FIGS. 3(a)-3(d) depict network systems comprising smart sensors, and two kinds of network connections connecting smart sensors to different receiving units, such as a Cabin Pressure controller and other components according to the present invention. The network systems are depicted in the context of Cabin Pressure Control Systems, but the network architectures can be used in general for other functions in an aircraft or in other environments.

Figure 3A:
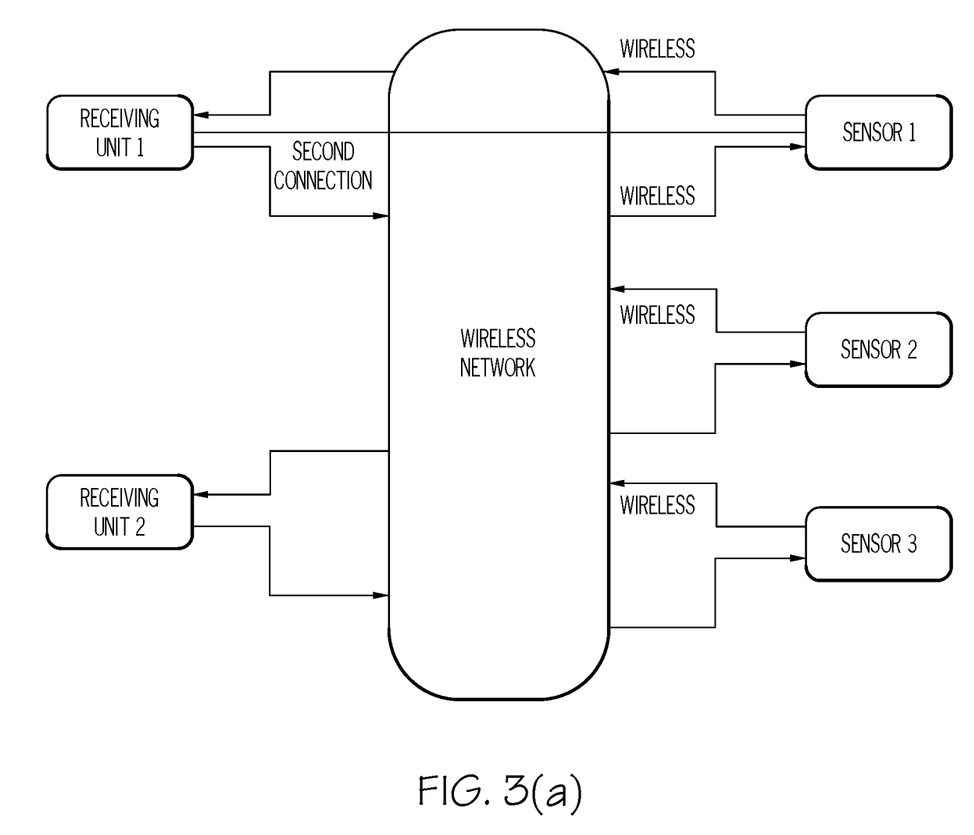
FIGS. 3(a)-3(d) depict network systems comprising multiple redundant and dissimilar smart sensors, and two kinds of network connections connecting receiving units, such as a pressure controller and other components according to an embodiment of the present invention.

As shown in FIG. 3(a), a network system may comprise: a first sensor Sensor 1, a second sensor Sensor 2, and a third sensor Sensor 3, which are all smart sensors. Sensor 1, Sensor 2, and/or Sensor 3 may generate processed data from its sensor readings. The system may also comprise a first receiving unit Receiving unit 1 and a second receiving unit Receiving unit 2 connected to Sensor 1, Sensor 2, and Sensor 3 by a wireless network connection to receive the processed data from the sensors. Receiving unit 1 may be further connected to Sensor 1 by a second connection different from the wireless connection to receive the processed data from Sensor 1, and the processed data is output from the sensors in a format so that Receiving unit 1 uses the processed data in the format without further processing. The network system shown in FIG. 3(a) may be used for a cabin pressure control system in an aircraft, or other functions in an aircraft or other environments.

Sensor 1, Sensor 2, and Sensor 3 may be smart sensors, such as absolute cabin pressure, and cabin-to-ambient differential pressure, as shown in FIGS. 2(a)-2(d). Using air data computer inputs and its own pressure sensor element and a micro-processor, Sensor 1 may transmit, via multiple network connections, such as wired and wireless connections, "value added" data, to reduce the complexity of the electronic hardware and computations in the receiving units, reduce the need for closely coupled time-based rate computations at the receiving units, such as a cabin pressure controller, and further enable more easily performed validation techniques for the received data.

The wireless network shown in FIG. 3(a) may be designed using any existing wireless technology for aircraft, or a new technology using future design and frequency communications requirements. An existing wireless technology may be the one being considered by the Aerospace Vehicle Systems Institute, as the Wireless Avionics Intra-Communications (WAIC). WAIC is currently proposed per the 802.15.4 standard for low-rate data and per the 802.11 a/g for higher speed data. The frequencies would be between 4200 MHz and 4400 MHz, using unused bandwidth of the Radio Altimeter as part of the Aeronautical Radio Navigation service for radio altimeters and ground transponders already installed in aircraft and on the ground.

In an embodiment, there may be only two smart sensors Sensor 1 and Sensor 2 connected to the receiving units Receiving unit 1 and Receiving unit 2, while Sensor 3 may not be needed. However, if additional control functions (like semi-automatic control) or additional dispatch-ability is desired, additional smart sensors can be added to the system.

In another embodiment, Sensor 3 may be a dis-similar sensor to Sensor 1, which may provide a same or similar data as Sensor 1 does to the receiving units, but implemented in a different way. For example, Sensor 1 may detect the cabin pressure directly, while Sensor 3 is dis-similar to Sensor 1, to obtain the same cabin pressure, but in a different way. Sensor 3 may compute the cabin pressure by adding the ambient pressure to the cabin-to-ambient differential pressure, where the cabin-to-ambient differential pressure may be obtained by a differential pressure sensor within Sensor 3, and the ambient pressure may be received by Sensor 3 via the air data computer. Therefore, dis-similar Sensor 3 provides a redundancy for Sensor 1. In addition, since dis-similar Sensor 3 obtains the result, such as the cabin pressure, in a different way, it can verify whether any sensor is wrong or not. If the cabin pressure obtained by Sensor 3 is different from the cabin pressure obtained by Sensor 1, then at least one of them is wrong, otherwise, both results should be the same. Hence, dis-similar sensors can provide a redundant data as well as a validity check for the data. Other parameters such as cabin pressure rate, can also be obtained by Sensor 1 and a dis-similar Sensor 3 using a different way. A more general dis-similar sensor can provide multiple and similar data instead of a single same data. For example, Sensor 1 may provide ten different kinds of data, and Sensor 3 may provide nine different kinds of data. If eight of the ten data provided by Sensor 1 and eight of the nine data provided by Sensor 3 are the same data, then the two sensors provide similar data.

Since multiple dis-similar sensors provide a same or similar data, the data availability can be improved to all users of the data. If one sensor fails, other dis-similar sensors can be used for the same function by the same part. If a function such as cabin pressure control, or oxygen deploy, is critical, the multiple, dis-similar sensors can be used to check and balance each other's data prior to allowing the function to "believe" any one sensor, or any one type of sensor. The check and balance of data from multiple dis-similar sensors may be performed by a voting methodology, or other similar techniques. Likewise, the maintenance computer can perform comparisons of sensor data and identify failed sensors by voting technique or other techniques.

The use of multiple dis-similar sensors is different from the traditional duplication of sensors with each controller. With the wireless network connection, a sensor can be shared by many controllers. An additional dis-similar sensor, which is also shared by the many controllers, can provide added redundancy for data safety and integrity. A controller can receive data from a sensor, and a second copy of the same data from a dis-similar sensor, therefore adding data safety and integrity. However, the number of additional dis-similar sensors may not be as high as the number of controllers using the data from the sensors. On the other hand, a duplication of sensors with the controllers can require one sensor for each controller, therefore no sharing of sensors among controllers can be accomplished.

Figure 3B:
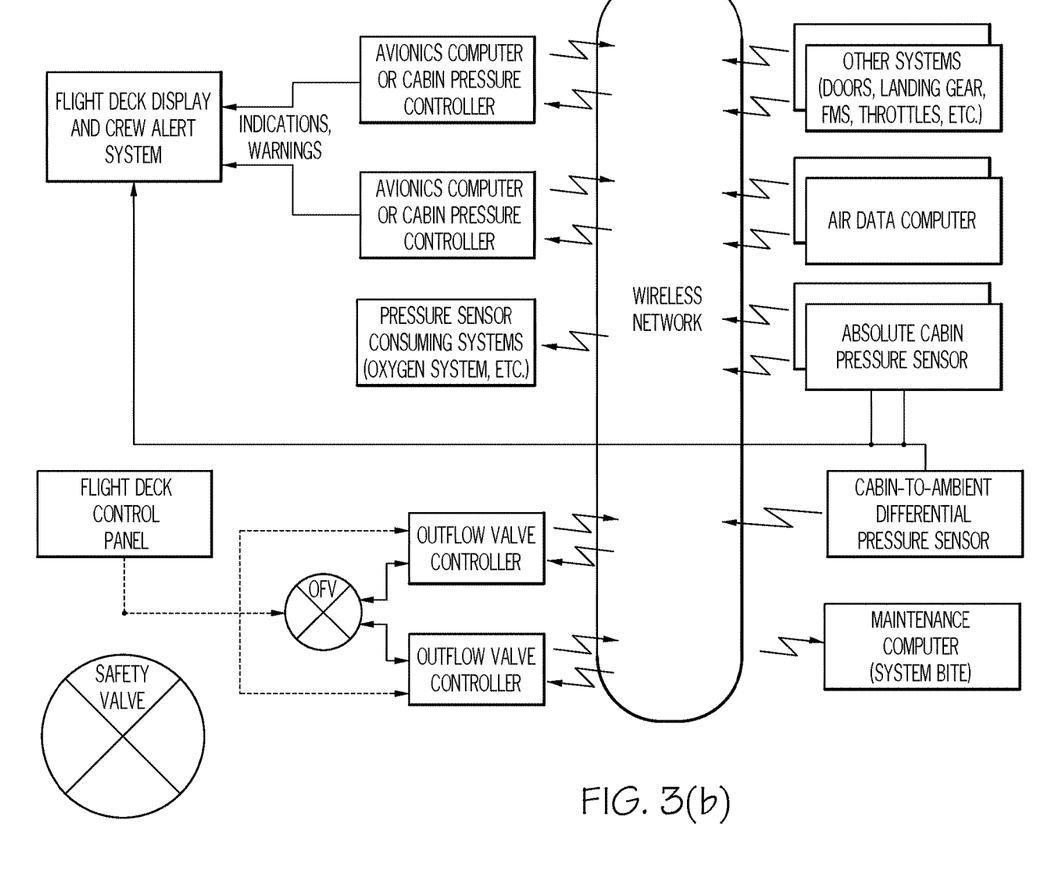
Figure 3C:
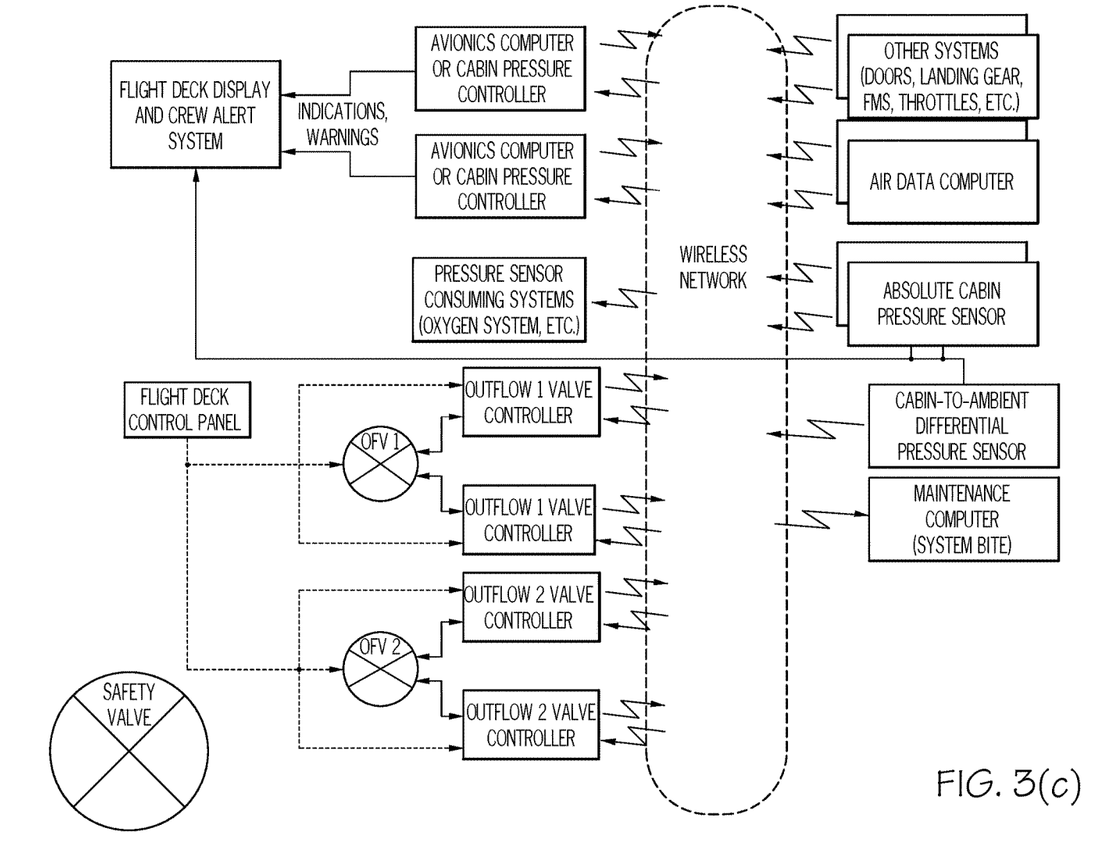

FIGS. 3(b)-3(c) depict network systems comprising multiple smart sensors such as Absolute Cabin Pressure Sensors and Cabin-to-Ambient Differential Pressure Sensors, and two kinds of network connections connecting various receiving units, such as a Cabin Pressure controller, Outflow Valve Controllers, Flight Deck Display System, Crew Alert System, Oxygen Deploy System, Air Data Computer, and Maintenance Computer, according to the present invention. These different functions are shown for examples only and are not limiting. These functions can be implemented by different ways. For example, Cabin Pressure controller may be implemented by a general purpose computer or by a specialized computer.

As shown in FIGS. 3(b)-3(c), the sensors and the various components are connected by a wireless network. Wireless transmitters and receivers may be installed in the various components such as the Cabin Pressure controller, with either direct equipment-to-equipment communications, or gateway data concentrators that further distribute data throughout the aircraft using WiFi, cell, or similar communications networks that allow redundant data paths and control the communications availability. Data message format for the wireless network may include: a source identification, a source information identifier, the data, and a cyclical redundancy check value which allows validation of the data upon receipt.

In addition, some more important systems, such as Flight Deck Display System and Crew Alert System may also receive inputs of the same data from the sensors by a second network connection, such as wired connection to ensure availability in case the wireless network fails. The second network connection between the sensors and the systems are designed as a precaution against common mode disruption of the wireless networks.

Thus, some receiving unit of the system, such as Flight Deck Display System, may receive a same data, such as cabin pressure, cabin pressure rate of change, and differential pressure, from three sources, one from a first sensor by the wireless connection, another one from the first sensor by a second network connection, and a third one from a dis-similar sensor to provide a same data.

As shown in FIGS. 3(b)-3(c), Cabin Pressure controller may receive the pressure sensor data, as well as other airplane system inputs, and perform control logic to control the cabin pressure and cabin pressure rate of change according to industry requirements. Cabin Pressure controller does not need to read raw pressure sensor data, convert to engineering units, or differentiate this information to compute cabin pressure (or cabin altitude) rate of change. Instead, Cabin Pressure controller can read and use the data from the smart sensors in the engineering units directly in the computation. Hence, Cabin Pressure controller may not need to have a high speed implementation, or high analog electronics requirements, because pressure sensor oversampling and high resolution analog-to-digital conversion techniques are no longer required for Cabin Pressure controller. As a consequence, Cabin Pressure controller can be implemented in almost any micro-processor based system on the airplane including avionics.

In addition, with the wireless network connecting the sensors to Maintenance computer, all maintenance functionality can be consolidated within Maintenance computer. Maintenance computer can receive all health related inputs from the cabin pressure control system and other interfacing systems directly, without wired data gateways via remote data concentrators, avionics computers, or even the Cabin Pressure controller consolidating information. Furthermore, with data received from all the sensors in the wireless network, Maintenance computer may be able to predict aircraft system heath trend in a better way with more advanced algorithms based on the data received from the sensors. In addition, the maintenance functional software can be developed on a lower level of development assurance, where Cabin Pressure controller and other airplane systems are often developed to development assurance level B or higher, whereas the maintenance software could be to development assurance level C or lower.

As shown in FIGS. 3(b)-3(c), Flight Deck Display System may utilize cabin altitude, cabin altitude rate of change, and cabin-to-ambient differential pressure from the same sensors. Crew Alert System receives information regarding excessive cabin altitude warning, excessive differential pressure warning, and other relevant inputs for pilot warnings. Flight deck display and Crew Alert system may perform the following procedure: receiving data from smart pressure sensors for display of cabin altitude, cabin altitude rate of change, and differential pressure, receiving data for excessive cabin altitude or excessive differential pressure, validating inputs from the multiple sources, and indicating information to the pilots for situational awareness or response to warnings.

Similarly, Oxygen Deploy System, and others, may also receive relevant data (cabin altitude for oxygen deploy) from these redundant sources. Oxygen Deploy System may perform the following procedure: receiving information from multiple smart pressure sensors, validating inputs from multiple sources, responding with system function (e.g., oxygen deployment)

Figure 3D:
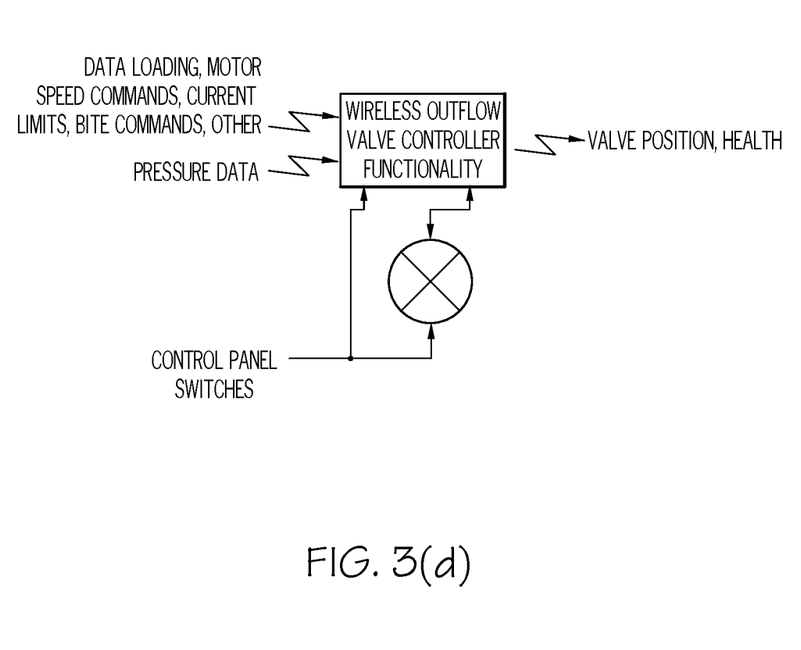

As shown in FIGS. 3(b)-3(d), Outflow Valves Controllers may receive the pressure sensor data, to check and balance the cabin pressure controller inputs against known system limits (cabin altitude, differential pressure, rate limits, etc.). Two Outflow Valves Controllers are shown in FIG. 3(b) to control one Outflow Valve (OFV), while two pairs of Outflow Valves Controllers are shown in FIG. 3(c) to control two OFVs, and a single Outflow Valves Controller and an OFV are shown in FIG. 3(d) as an example.

Outflow Valves Controllers may also receive the smart pressure sensor data. Thus, when the Cabin Pressure controller provides a motor speed (or valve position) input, the outflow valve can stop responding to the Cabin Pressure controller inputs when a limit threshold violation is indicated from the smart pressure sensor (excess cabin altitude, excess differential pressure, excess rate, etc.). The advantage here is that the outflow valve controller does not have to convert to engineering units, and the controller has access to multiple inputs for voting or other validation means, with no real penalty to the airplane due to wire weight, etc.

Outflow Valves Controller, which may be a motor controller, may transmit its valve position and health to the Cabin Pressure controller and Maintenance computer and to Flight Deck Display system. Cabin Pressure controller can know if the outflow valve is responding to its commands and whether the outflow valve is available (not faulted). For example, Cabin Pressure controller that utilizes the pressure sensor data can command Outflow Valve Controller which also receives the pressure sensor data, and the outflow valve controller can check and balance the commands from Cabin Pressure controller based on the same data from the sensors. Maintenance computer can store any outflow valve faults and identify the outflow valve position over time (potentially used in vehicle health management, to detect fuselage leaks, etc.). Flight Deck Display System can display the outflow valve position.

In addition, the Outflow Valves Controllers can be connected to Flight Deck Display system by a second network connection, such as wired connection. In the event of a loss of wireless network data, the outflow valve could be commanded directly by a backup wired interface to Flight Deck Display panel switches.

A second outflow valve (required for many aircraft with flow biasing or other ventilation functional requirements) can be added with little penalty, as shown in FIG. 3(c). In the case of a dual outflow valve control system as shown in FIG. 3(c), Cabin Pressure controller can know both outflow valve positions simultaneously to command each outflow valve to the required position to obtain the expected flow bias percentage required by the ventilation system. The advantage of wireless communications are evident in that there is little to no transportation delay of this information.

It should be understood, of course, that the foregoing relates to exemplary embodiments of the invention and that modifications may be made without departing from the spirit and scope of the invention as set forth in the following claims.

I claim:

1. A pressure control system, comprising:
   a first sensor that includes a first function sensor configured to detect a functional measurement;
   a second sensor that includes a second function sensor configured to detect the functional measurement in a different way than the first function sensor, wherein the first sensor and the second sensor generate processed data from the functional measurements, the processed data including time-based rate computations on the functional measurements; and
   a first receiving unit and a second receiving unit connected to share the first sensor and the second sensor over a wireless network to receive the processed data from the first sensor and the second sensor;
   wherein the first receiving unit is connected to the first sensor by a second network different from the wireless network to receive the processed data from the first sensor, where the first sensor is not shared with the second receiving unit over the second network, and the processed data is output in a format so that the first receiving unit uses the processed data in the format without further processing.

2. The pressure control system of claim 1, wherein the first receiving unit is one of a flight deck display system and a crew alert system, and the second receiving unit is a cabin pressure controller.

3. The pressure control system of claim 1, further comprising a plurality of sensors connected to the first receiving unit and the second receiving unit by wireless connections, while a part of the plurality of sensors further connected to the first unit by a third connection.

4. The pressure control system of claim 1, wherein the processed data is selected from: a cabin pressure, a cabin pressure rate of change, a cabin altitude, a cabin altitude rate of change, a cabin-to-ambient differential pressure, a cabin-to-ambient differential pressure rate of change, an atmosphere pressure, an airplane altitude, an airplane altitude rate of change, an excessive cabin altitude indication, an excessive differential pressure indication, a signal to deploy oxygen, and a status of sensor or sensor input health.

5. The pressure control system of claim 1, further comprising a third receiving unit selected from an outflow valve controller, an oxygen deploy system, and a maintenance computer system, wherein the third receiving unit is connected to the first sensor and the second sensor by the wireless connection to receive the processed data from the first sensor and the second sensor.

6. The pressure control system of claim 1, wherein the first sensor comprises a function sensor unit, an analog-to-digital converter, a processor, a first network interface for the wireless connection, and a second network interface for the second connection with the first receiving unit, the function sensor unit detects the sensor reading, the analog-to-digital converter converts the sensor reading to a digital format which is further processed by the processor to generate the processed data.

7. The pressure control system of claim 1, further comprising: a third sensor which is dis-similar to the first sensor, wherein the third sensor is connected to the first receiving unit and the second receiving unit by the wireless connection.

8. The pressure control system of claim 7, wherein the first receiving unit receives a first copy of data from the first sensor transmitted by the wireless connection, a second copy of data from the first sensor transmitted by the second connection, and a third copy of data from the third dis-similar sensor, the first copy of data, the second copy of data, and the third copy of data are all equal when they are transmitted and received correctly.

9. The pressure control system of claim 1, wherein the first receiving unit commands the second receiving unit based on the received processed data.

10. The pressure control system of claim 7, wherein the first sensor generates a cabin pressure directly from its sensor reading, and the third sensor computes the cabin pressure by adding an ambient pressure to a differential pressure obtained from its sensor reading.

11. A pressure control system, comprising:
a first sensor, and a second sensor which is dis-similar to the first sensor, wherein the first sensor and the second sensor generate processed data from their sensor readings;
a receiving unit connected to the first sensor and the second sensor to receive the processed data from the first sensor and the second sensor,
wherein the receiving unit is connected to the first sensor by a first connection to a first network and a second connection to a second network, and connected to the second sensor by a third connection to the first network, the receiving unit having no connection to the second sensor through the second network.

12. The pressure control system of claim 11, wherein the first sensor generates the processed data from its sensor reading, and the processed data is output in a format so that the receiving unit uses the processed data in the format without further processing.

13. The pressure control system of claim 11, wherein the first sensor comprises a function sensor unit, an analog-to-digital converter, a processor, a first network interface for the wireless connection, and a second network interface for the second connection with the receiving unit, the function sensor unit detects the sensor reading, the analog-to-digital converter converts the sensor reading to a digital format which is further processed by the processor to generate the processed data.

14. The pressure control system of claim 11, wherein the processed data is selected from: a cabin pressure, a cabin pressure rate of change, a cabin altitude, a cabin altitude rate of change, a cabin-to-ambient differential pressure, a cabin-to-ambient differential pressure rate of change, an atmosphere pressure, an airplane altitude, an airplane altitude rate of change, an excessive cabin altitude indication, an excessive differential pressure indication, a signal to deploy oxygen, and a status of sensor or sensor input health.

15. The pressure control system of claim 11, wherein the first sensor generates a cabin pressure directly from its sensor reading, and the second sensor computes the cabin pressure by adding an ambient pressure to a differential pressure obtained from its sensor reading.

16. The pressure control system of claim 11, wherein the receiving unit is one of a flight deck display system and a crew alert system.

17. The pressure control system of claim 11, further comprising a second receiving unit connected to the first sensor and the second sensor by the wireless connection to receive the processed data from the first sensor and the second sensor, wherein the second receiving unit is selected from a cabin pressure controller, an outflow valve controller, an oxygen deploy system, and a maintenance computer system.

18. A cabin pressure control system for an aircraft, comprising:
a first smart sensor that includes
a first function sensor to detect a functional measurement, and
a first processor to compute rate of change data of the functional measurement to generate first processed data; and
a second smart sensor that includes
a second function sensor to detect the same functional measurement in a different way than the first function sensor, and
a second processor to process the functional measurement from the second function sensor to generate second processed data;
a wireless network;
a first receiving unit connected to the first sensor and the second sensor by a wireless connection of the wireless network to receive the first and second processed data from the first sensor and the second sensor, wherein the first receiving unit is further connected to the first sensor by a second connection to redundantly receive the first processed data from the first sensor, and the first receiving unit is one of a flight deck display system and a crew alert system; and a cabin pressure controller connected to the first sensor and the second sensor by the wireless connection to receive the first and second processed data from the first sensor and the second sensor.

19. The cabin pressure control system for an aircraft of claim 18, wherein the first processed data is selected from: a cabin pressure rate of change, a cabin altitude rate of change, a cabin-to-ambient differential pressure rate of change, and an airplane altitude rate of change.

20. The cabin pressure control system for an aircraft of claim 18, wherein the first receiving unit receives a first copy of the first processed data from the first sensor transmitted by the wireless connection, a second copy of the first processed data from the first sensor transmitted by the second connection, and the second processed data is a third copy of the first processed data, the first copy, the second copy, and the third copy are all equal when they are transmitted and received correctly, and the first copy of data, the second copy, and the third copy are compared to check which copy of data is valid to be used by the first receiving unit.

* * * * *